United States Patent
Reimchen

(10) Patent No.: US 9,784,324 B2
(45) Date of Patent: Oct. 10, 2017

(54) SLEEVE-TYPE FREEWHEEL

(71) Applicant: Schaeffler Technologies AG & Co. KG, Herzogenaurach (DE)

(72) Inventor: Alexander Reimchen, Herzogenauarch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 97 days.

(21) Appl. No.: 14/772,172

(22) PCT Filed: Jan. 22, 2014

(86) PCT No.: PCT/DE2014/200022
§ 371 (c)(1),
(2) Date: Sep. 2, 2015

(87) PCT Pub. No.: WO2014/146653
PCT Pub. Date: Sep. 25, 2014

(65) Prior Publication Data
US 2016/0017936 A1    Jan. 21, 2016

(30) Foreign Application Priority Data
Mar. 18, 2013  (DE) .......................... 10 2013 204 656

(51) Int. Cl.
*F16D 41/067* (2006.01)
(52) U.S. Cl.
CPC ................. *F16D 41/067* (2013.01)
(58) Field of Classification Search
CPC .......... F16D 2041/0665; F16D 41/067; F16D 2001/103; F16D 1/116
See application file for complete search history.

(56) References Cited

U.S. PATENT DOCUMENTS 2,835,363 A * 5/1958 Long ...................... F16D 41/067
192/45.007
2002/0148696 A1  10/2002 Enomoto et al.
(Continued)

FOREIGN PATENT DOCUMENTS

DE    102008021960    11/2009
FR        2897117      8/2007

*Primary Examiner* — Stacey Fluhart
(74) *Attorney, Agent, or Firm* — Volpe and Koenig, P.C.

(57) ABSTRACT

A sleeve-type freewheel having a sleeve with clamping ramps which are provided on the inner circumference and a plurality of needle-shaped or roller-shaped clamping bodies which are assigned to the clamping ramps, and a housing formed of lightweight metal and in which the sleeve is received, wherein the sleeve (2) has a radial flange (11), on which at least one radial projection (12) is provided, on which an axially projecting hook (16) is formed, and wherein a plurality of radially inwardly projecting contact sections (24) which are arranged distributed about the circumference are provided on the inner circumference of the housing (8), wherein the radial projection (12) is received between two contact sections (24) in the mounting position, wherein a groove (26) is formed between the contact sections (24) and a housing shoulder (25) which supports the radial flange (11) with the side (15) which has the hook (16), in which groove (26) the radial flange (11) is secured in a clamping manner with the hooked (16) being hooked on the housing shoulder (25) in the mounting position, in which the radial projection (12) bears against one contact section (24).

10 Claims, 6 Drawing Sheets

(56) References Cited

U.S. PATENT DOCUMENTS

| | | | |
|---|---|---|---|
| 2003/0029686 A1 | 2/2003 | Pascoe | |
| 2004/0099498 A1* | 5/2004 | Kurita | B60N 2/1615 |
| | | | 192/12 B |
| 2005/0189193 A1* | 9/2005 | Ikeda | F16D 41/067 |
| | | | 192/45.1 |
| 2009/0028636 A1* | 1/2009 | Kirschey | F16D 1/076 |
| | | | 403/345 |
| 2011/0108382 A1* | 5/2011 | Takada | F16D 41/067 |
| | | | 192/45.013 |
| 2011/0162933 A1* | 7/2011 | Li | F16D 41/067 |
| | | | 192/45.01 |
| 2013/0126290 A1* | 5/2013 | Parameswaran | F16D 15/00 |
| | | | 192/45.001 |

\* cited by examiner

SLEEVE-TYPE FREEWHEEL

FIELD OF THE INVENTION

The invention relates to a sleeve-type freewheel with a sleeve with clamping ramps provided on the inner circumference and several needle-shaped or roller-shaped clamping bodies allocated to the clamping ramps, as well as a housing that is made from lightweight metal and holds the sleeve.

BACKGROUND

A freewheel is a direction-switched coupling that is used in a wide range of different applications to decouple a part of a drive train from rotational movement when changing the load relationships. Example uses are in mechanical engineering, e.g., use as a return stop or overrunning clutch. One known example is further the use in the automotive industry as a starter freewheel, where the freewheel also acts as an overrunning clutch. Such a freewheel is known, for example, from DE 10 2008 021 960 A1.

Such a freewheel comprises a sleeve that forms the outer ring and on whose inner surface a clamping ramp contour is formed, wherein clamping bodies, typically rollers or needles, run on these clamping ramps. The sleeve is connected rigidly to the shaft or a housing, which has always required, in freewheels known to date, the use of additional machine elements, such as screws, thrust rings, or the like. Especially for the connection of the freewheel sleeve to a housing made from lightweight metal—which is required more frequently with respect to more and more reductions in weight—additional machine elements, such as thrust rings or screws are absolutely necessary, because otherwise problems can result from any elastic deformation of the freewheel sleeve when torque is applied, as well as from the very different expansion coefficients of the materials being used. The construction of such a sleeve-type freewheel with a lightweight metal housing is consequently relatively complicated.

SUMMARY

The invention is based on the objective of providing a sleeve-type freewheel that enables a secure connection to the housing with a simple design.

To meet this objective, for a sleeve-type freewheel of the type noted above it is provided according to the invention that the sleeve has a radial flange on which at least one radial projection is provided on which an axially projecting hook is formed and that on the inner circumference of the housing there are several radially inward projecting contact sections distributed around the circumference, wherein the radial projection is held between two contact sections in the mounting position, wherein a groove is formed between the contact sections and a housing shoulder supporting the radial flange with the side having the hook, wherein in the groove, in the mounting position in which the radial projection contacts a contact section, the radial flange is held in a clamping manner with hooks hooking on the housing shoulder.

The freewheel according to the invention provides a purely mechanical clamping connection between the housing and the sleeve that enables a secure and rotationally fixed connection of both parts in two directions, that is, the locking direction and the free-running direction. For this purpose, on the radial flange of the sleeve, according to the invention there is at least one, preferably more, for example, six, radial projections that extend radially some way past the circumference of the sleeve. On the or at least one radial projection there is an axially projecting hook, wherein "hook" is understood to be any geometric shape that is able to "interlock" with a counter bearing surface.

The housing has, on its side, several inward projecting contact sections on its cylindrical inner circumference. These are positioned in number and arrangement so that when the freewheel is set in the housing, the one or more radial projections each engage between two adjacent contact sections. The contact sections are adjacent to a radially inward drawn housing shoulder that is used as a push-in limit when inserting the freewheel, but also gains the central function of forming a counter bearing for the radial projections with respect to the radial flange and simultaneously also the "interlock surface" for the hook. To make this possible, between each contact section and the housing shoulder there is a groove in which the radial flange is inserted section by section when the freewheel is turned with respect to the sleeve after setting through axial insertion into the mounting position, which requires a rotation by a few angular degrees. In this way, the radial flange is inserted into the groove section by section. With its one side, it engages the upper groove flank formed by the contact section and, with the other side, it is supported on the housing shoulder. Through rotation and the corresponding geometric design of the radial flange with respect to the radial projection or projections in connection with the counter bearing, this leads to a clamping of the radial flange in the groove that in turn has the result that the hook hooks into this groove under elastic or plastic deformation of the housing shoulder. The mounting position is reached when the sleeve is turned until the radial projection or projections contact with a corresponding stop face on adjacent contact sections of the housing. In this mounting position, both parts, that is, the sleeve and housing, are connected rigidly to each other, so that relative motion is not possible in the locking direction or in the free-running direction. This is because, in the locking direction, the freewheel is pressed by means of the respective stop face of the radial projection or projections against the contact sections of the housing, which hereby rules out relative motion. In the free-running mode, in turn, the hook and its interlocking in the housing shoulder act against relative motion.

As can be seen, in the sleeve-type freewheel according to the invention, a pure clamping fastening of the freewheel in the housing is provided that is secured in two directions without requiring a single additional mounting part, such as a screw or thrust ring or the like.

One radial projection as a stop limit in the inward rotational direction is sufficient. Preferably several radial projections are provided so that multiple stops are produced.

Although in principle a single hook is sufficient if this is hooked with adequate fixedness in the housing shoulder, it is useful to form a hook on multiple radial projections that are preferably distributed equidistantly, wherein, in the mounting position, the respective hooks are hooked onto the housing shoulder.

In other words, over the multiple hooks there are several respective "hooking points" that provide for the secure fixing in connection with the clamping of the radial flange in the groove area. If, for example, there are six radial projections, then a job can be formed on all radial projections, but it is also conceivable to provide a hook only on every second radial projection.

As described, a "hook" is understood to be any geometric shape that projects from the plane of a radial projection surface. Preferably, the hook or hooks are constructed with a hook tip or hook edge that is directed opposite the direction of the respective stop face of an adjacent radial projection. In other words, each hook also has a defined "hooking direction," in which the hook tip or hook edge is constructed accordingly geometrically and the stop face, formed by an end face of the adjacent radial projection, is oriented quasi in the opposite direction. In this way, a direction-defined hooking can be achieved against the inward rotating direction, so that the stop is designed by means of the respective radial projections defined in one rotating direction and the "interlocking" is designed by means of the hook or hooks defined in the other rotating direction.

As described, for the effect of the "interlocking" of the hook or hooks in the housing shoulder, the radial flange is clamped in the mounting position in the groove or the individual groove sections in the inward rotation. In other words, the axial distance of the tip of the hook to the surface of the radial projection on the other projection side is somewhat larger than the distance between the housing shoulder and lower edge of the contact section, that is, the groove height. The covering is selected so that the hooks deform the housing material, that is, the lightweight metal material, such as aluminum, both elastically and also plastically during installation. To easily realize this clamping, preferably ramp-like clamping sections are formed on the radial flange adjacent to the respective radial projections. These clamping sections engage the respective contact sections during the inward rotating motion when it is inserted into the respective groove. If the freewheel sleeve is rotated by a short angle into the mounting position after insertion, then the ramp-like clamping sections are inserted or run into the respective grooves on the upper groove flanks such that, for further rotation, the radial flange is clamped in the groove and pressed against the housing shoulder when viewed axially, wherein the hook or hooks deform and interlock with the housing shoulder or the housing material.

To easily enable the rotation of the sleeve in the mounting position, on the radial flange or on one or more radial projections there are receptacles or openings for setting a mounting tool with which the sleeve is turned into the mounting position after insertion into the housing. In the simplest design, corresponding openings are constructed in the form of holes preferably in the radial projections, wherein corresponding pins of the mounting tool can be inserted into these holes.

Here, preferably an even number of radial projections is provided, wherein a hook and a receptacle or opening are provided alternately on the radial projections. If, for example, six radial projections are used, then on the first, third, and fifth radial projection there is a hook, while on the second, fourth, and sixth radial projection there is an opening for setting the mounting tool. Obviously, fewer or more than six projections could also be provided; the actual design is only dependent on the size of the freewheel to be dimensioned.

The sleeve itself is preferably a sheet-metal part, advantageously a steel sheet metal part, on which the hooks and optionally the ramp-like clamping sections, as well as the receptacles or openings for setting the mounting tool are formed through embossment or punching. A metal sheet can be shaped in a relatively simple way and with shape precision through deep-drawing or the like, wherein, during this process, the corresponding interacting or essential components, namely the hook or hooks and, if provided, the ramp-like clamping sections and openings, etc. can be constructed at the same time. The housing itself is preferably made from aluminum, but could also be made from another lightweight metal or corresponding alloys.

BRIEF DESCRIPTION OF THE DRAWINGS

An embodiment of the invention is shown in the drawing and is described in more detail below. Shown are.

DETAILED DESCRIPTION OF THE PREFERRED EMBODIMENTS

Figure 1:
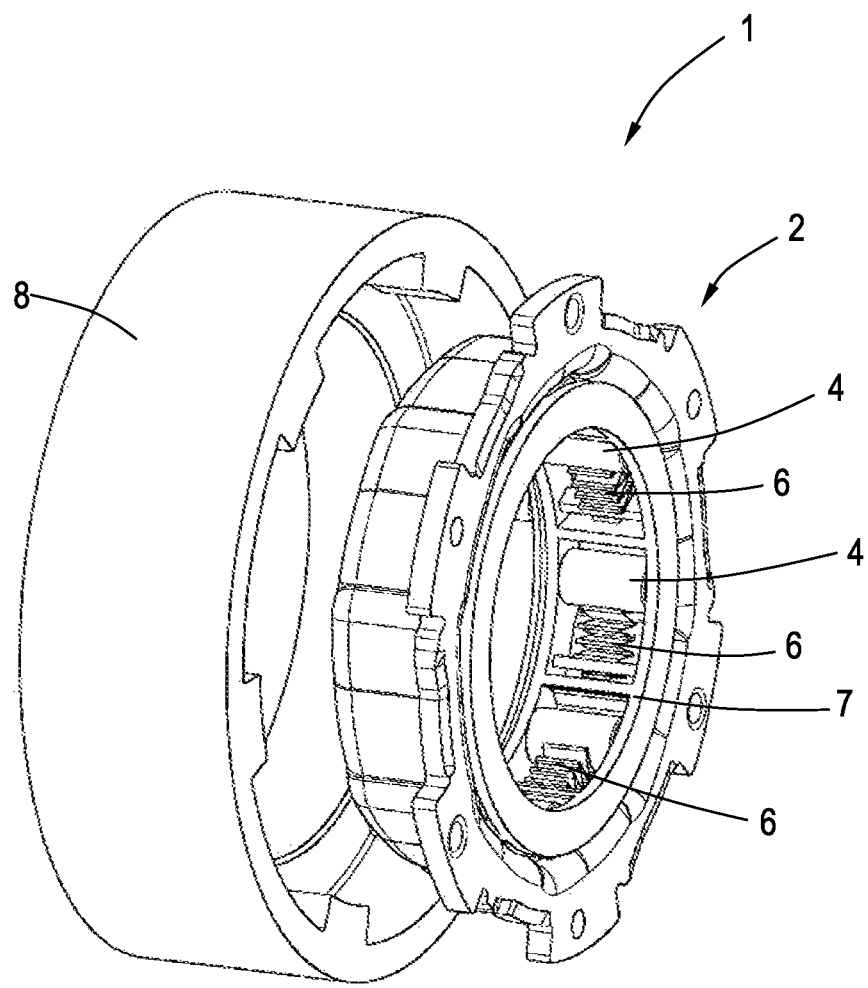
FIG. 1 a view of a sleeve freewheel according to the invention before the assembly of the sleeve and housing, FIG. 2 a perspective view of the freewheel sleeve, FIG. 3 a perspective view of the freewheel sleeve from FIG. 2 from below, FIG. 4 a view of the sleeve with radial projection shown in section in the area of a hook, FIG. 5 a perspective view of the lightweight metal housing, FIG. 6 a section view through the housing from FIG. 5, FIG. 7 the freewheel inserted into the housing with mounting tool to be applied, FIG. 8 a view of the housing with inserted freewheel after insertion and before rotation in the mounting position, FIG. 9 the arrangement from FIG. 8 after rotation into the mounting position, FIG. 10 a section view through the arrangement from FIG. 9 in a first section plane, and FIG. 11 a section view through the arrangement from FIG. 9 in a second section plane.

FIG. 1 shows a sleeve-type freewheel 1 according to the invention, comprising a sleeve 2 that has, on its inner wall, a contour comprising several clamping ramps 3, with clamping bodies in the form of rollers 4 being allocated to each of these clamping ramps, wherein these clamping bodies are held in a cage 7 by means of springs 6. Depending on the direction of rotation or situation, the rollers 4 run on the clamping ramps 3 and assume a clamping position in the blocking direction and a released position in the free-running direction. The basic structure of such a freewheel arrangement has been known for a long time.

The sleeve-type freewheel further comprises a housing 8 made from lightweight metal, for example, aluminum, which has essentially a cylindrical shape and is used for holding the sleeve 2. It is shaped essentially complementary to the radial geometry of the sleeve 2, which the structuring in the area of its inner walls concerns, as will be discussed below.

Figure 2:
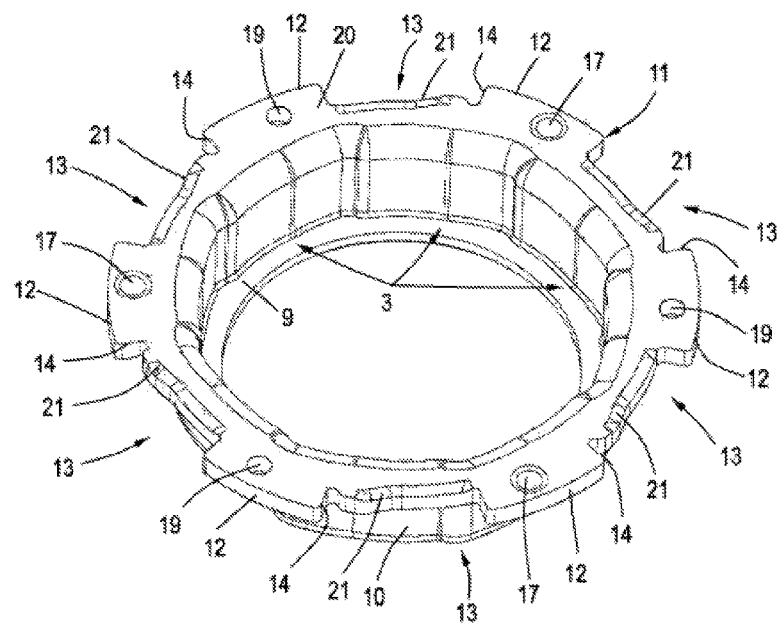
Figure 3:
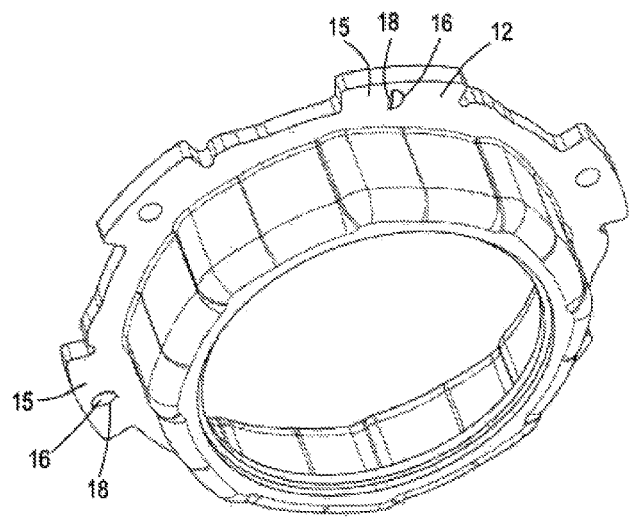

As FIG. 2 shows, in particular, the sleeve 2 has an inwardly directed, lower radial flange 9 on which the cage 7 sits in the mounting position. The axially extending sleeve section 10 is provided as discussed with the clamping ramp contour. A radial flange 11 contacts it, which has, in the illustrated embodiment, six radial projections 12 that stand orthogonal to the sleeve section 10. Each radial projection 12 is set at a distance from the adjacent radial projection by means of a corresponding recess 13. Each recess 13 is bordered on one side by a stop surface 14 of each radial flange 12. This stop surface 14 interacts with a housing-side contact section, which will be discussed in more detail below.

Furthermore, in the shown example, hooks 16 are formed on three radial flanges 12 on their respective bottom side 15. These hooks are formed by a corresponding embossment 17 formed on the opposite radial projection side in connection with the molding tool. Each hook 16 has an elongated hook edge 18 by which the hook 16 interlocks on the housing side for fixing the sleeve 2 in the housing 8, which will be discussed in more detail below.

On the respective other radial projections 12 there is an opening 19 that is likewise formed during the production of the sleeve that is a steel sheet part produced in deep-drawing process in connection with corresponding embossing or punching work. The openings 19 are used for holding or setting a mounting tool that is used to turn the sleeve 2 into the mounting position in the housing 8, which will be discussed in more detail below.

As FIG. 2 further shows, on the top side 20 of the radial flange 11 in the area of the respective recesses 13 there are ramp-like clamping sections 21, that is, sections that run at an angle or ramp-like toward the flange upper side 20. They open there, see, in particular, FIG. 4, into an undercut or clamping section 22 that engages in the mounting position with a contact section on the housing 8, which will be discussed in more detail below. The ramp-like clamping sections 21 are also drawn somewhat radially outward, compared with the other area of the radial flange 11 in the area of the recesses 13, so that the sleeve 2 can be set in the housing 8 and the radial flange 11 can be bypassed on the contact sections of the housing 8.

Figure 4:
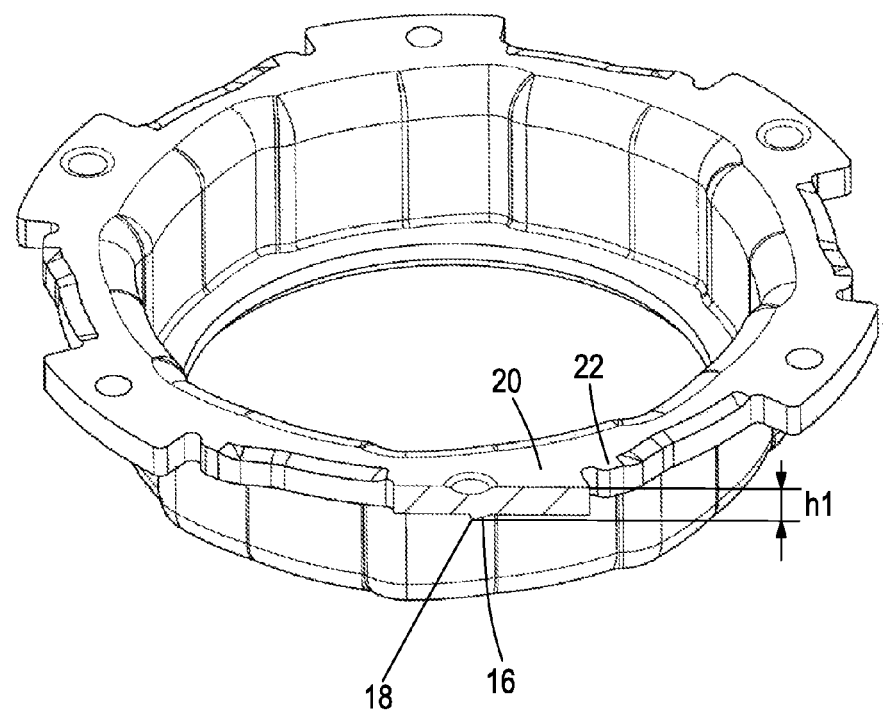

As can be seen in FIG. 4, the hook 16 extends with its hook edge 18 somewhat out from the surface 15 of the radial projection 12, so that, overall, a height h1 between the hook edge 18 and the surface 20 of the radial flange is produced. Then it comes into contact with the clamping fixing device, according to which the height h1 is somewhat greater than the height h2 of a groove provided on the housing side, which will be discussed in more detail below.

Figure 5:
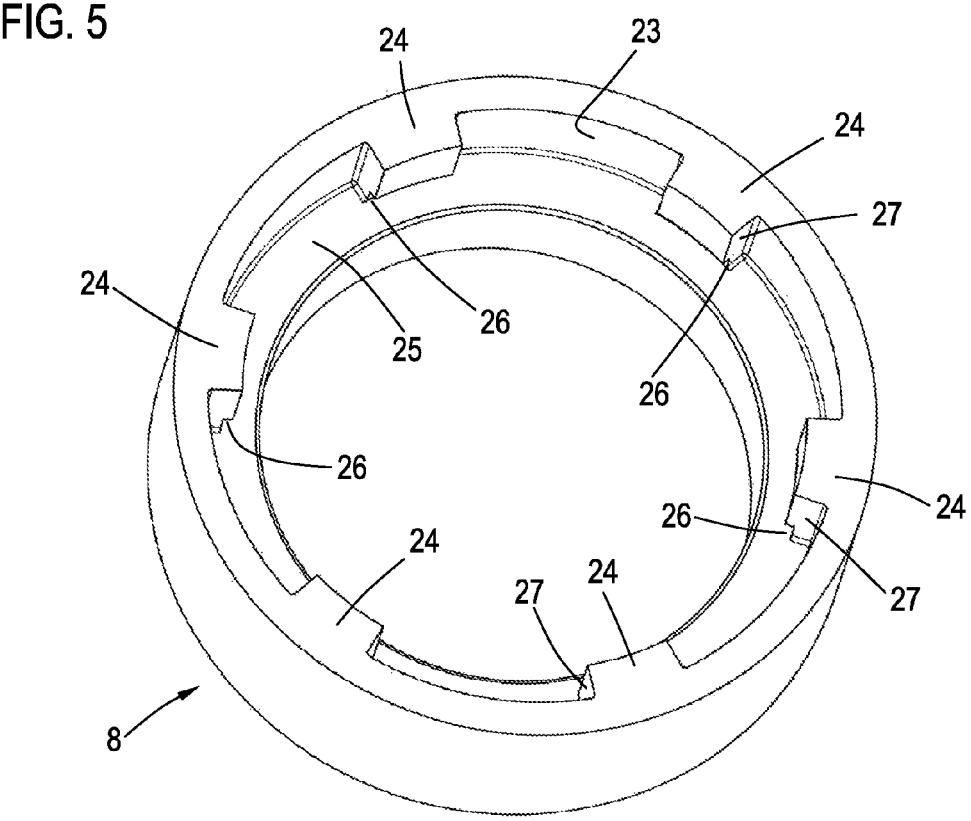

FIG. 5 shows a perspective view of the lightweight metal housing 8. On its cylindrical inner circumference 23 there are also, in the illustrated example, corresponding to the number of radial projections 12, six contact sections 24 that extend somewhat radially inward. In the area of the lower end of the contact section, where this transitions into a housing shoulder 25 that is drawn radially inward, there is a notch for forming a groove 26, so that the groove 26 is thus formed—viewed axially—between the housing shoulder 25 and the parallel upper surface of the contact section 24. Viewed radially, the groove is limited by the radial surface of the contact section in the area of the notch. Each contact section 24 has, viewed circumferentially, also a corresponding stop surface 27 that interacts with each stop surface 14 of a radial projection 12.

Figure 6:
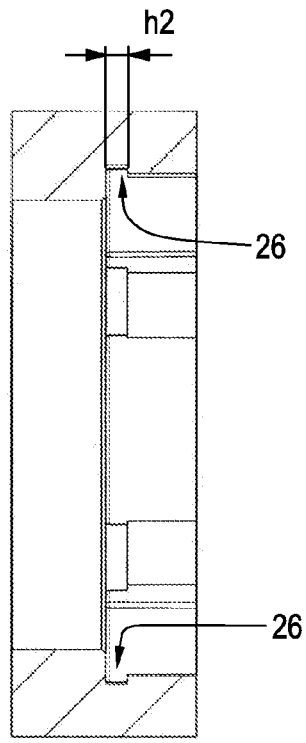

The height h2 of groove 26 can be seen in the section view according to FIG. 6. The height h2 is somewhat smaller than the height h1 on the radial flange, so that, in principle, a clamping connection can be achieved.

Figure 7:
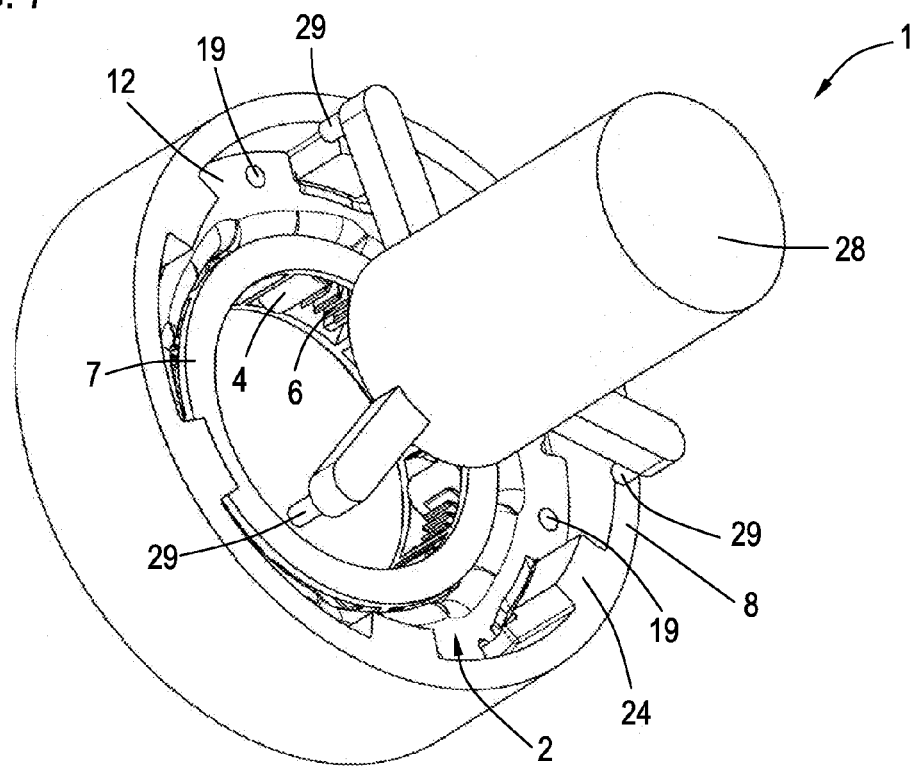

FIG. 7 shows a view of the sleeve-type freewheel 1 during assembly. As can be seen, the sleeve 2 that is already provided with the cage 7 equipped with rollers 4 and springs 6 is inserted into the housing 8, wherein the radial projections 12 each engage in the intermediate spaces between two contact sections 24 of the housing 8 or the respective contact sections 24 of the housing 8 engage in the recesses 13 on the radial flange 11. Thus, a complementarily shaped geometry on the housing and on the radial flange is realized.

Further shown is a mounting tool 28 that has, in the shown example, three engagement pins 29 that are inserted into the openings 19 on the respective radial projections 12, so that a rotationally fixed connection is produced. After insertion, the sleeve 2 can be rotated into the mounting final position by means of the mounting tool 28.

Figure 8:
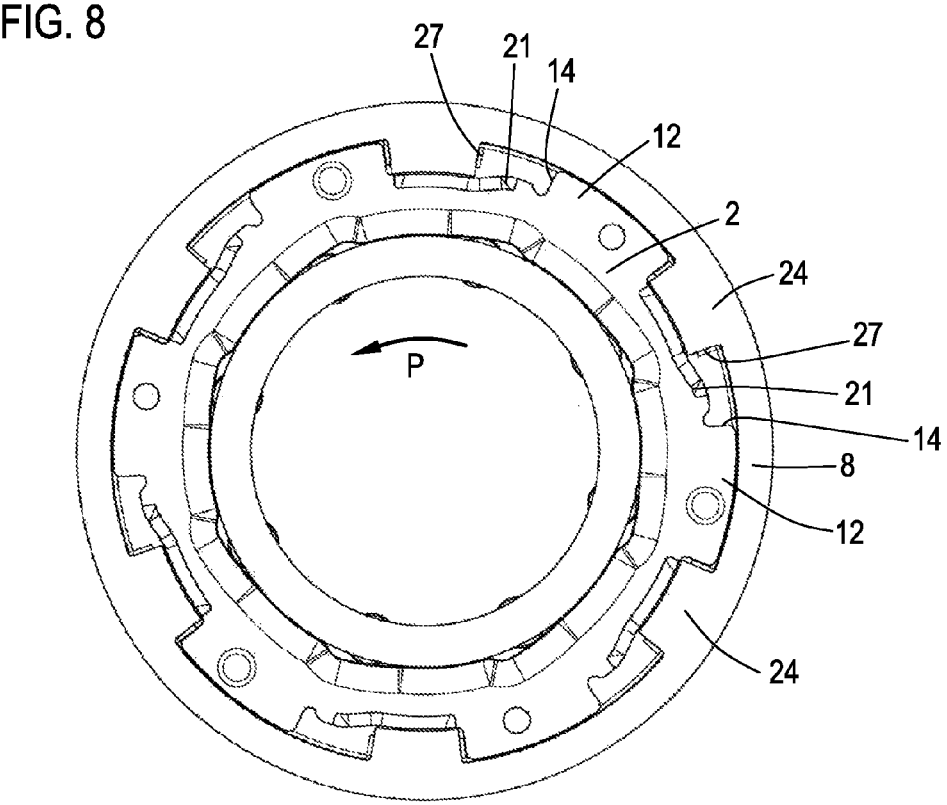

Without showing the mounting tool 28, FIG. 8 shows a top view of the arrangement from FIG. 7, that is, in this figure, the equipped sleeve 2 is shown in its inserted position in the housing 8 before it is brought into the actual mounting position. As can be seen, a radial projection 12 is between two contact sections 24. The stop surfaces 14 of the radial projections 12 are still removed from the stop surfaces 27 of the contact sections. Also, each ramp-like clamping section 21 of the radial projection 12 is still at a distance to the respective groove 26 of each clamping section 21. The radial flange 11 is, in the area of the recess 13 next to the clamping sections 21, somewhat smaller in diameter than in the clamping sections 21, so that the radial flange can be inserted axially along the contact sections 24.

Figure 9:
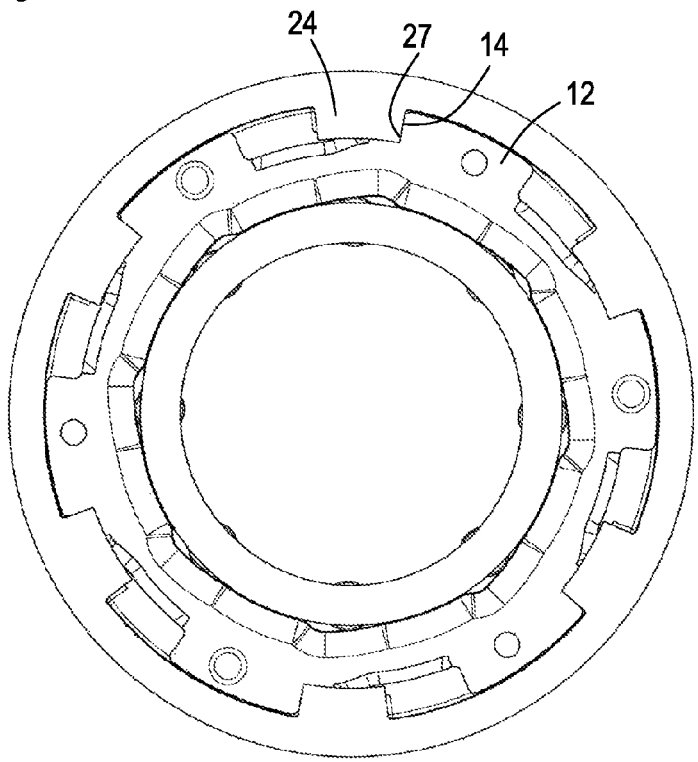

If now, after setting the mounting tool 28, the sleeve 2 is turned in the direction of the arrow P in FIG. 8, that is, in the clamping direction, then the ramp-shaped clamping sections 21, according to which the radial flange contacts the housing shoulder 25, are inserted by the rotational movement from the side into the respective groove 26. Because the height h1 is somewhat greater than the height h2, this insertion movement results in that the ramp-shaped clamping sections 21 run against the surfaces of the clamping sections 24 bordering the respective groove 26 on the top side. Toward the housing shoulder 25, the radial flange is supported by means of the hooks 16. Due to the ramp-like contour of the clamping sections 21, further rotation now causes the radial flange 11 to be pressed farther and farther and greater and greater against the housing shoulder 25, wherein this causes an initially elastic, then plastic deformation of the material of the housing shoulder 25 by the hooks 16, that is, these quasi cut or interlock or dig into the material. The rotational motion is realized until the stop faces 14 of the radial projections 12 contact the stop faces 27 of the contact sections 24 and further rotation is ruled out. This mounting final position is shown in FIG. 9.

In this position, the sleeve is connected rigidly to the housing in every rotational direction. In the blocking direction, the freewheel or the sleeve is fixed against the stop faces 27 due to the stop of the stop faces 14. In the opposite direction, that is, the free-running direction, the rotationally locked fixing is realized by the hooking or interlocking of the hooks 16 in the housing shoulder 25.

Figure 10:
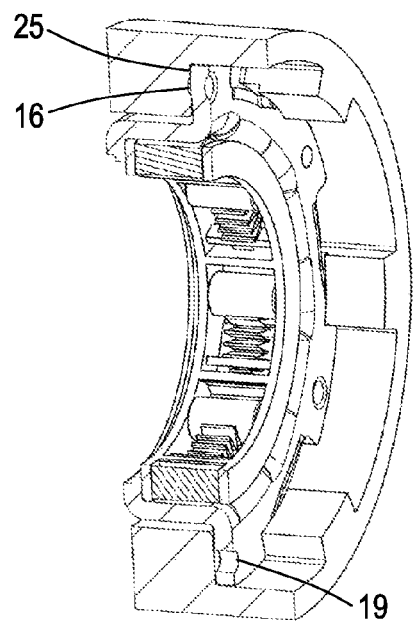

FIG. 10 shows a section view showing this interlocking. As can be seen, the hook 16 engages in the material of the housing shoulder 25, see one half of the picture. Thus, this deforms plastically and becomes hooked there. In the area of the other half of the picture, the opening 19 in which the mounting tool engages, is shown in the section view.

Figure 11:
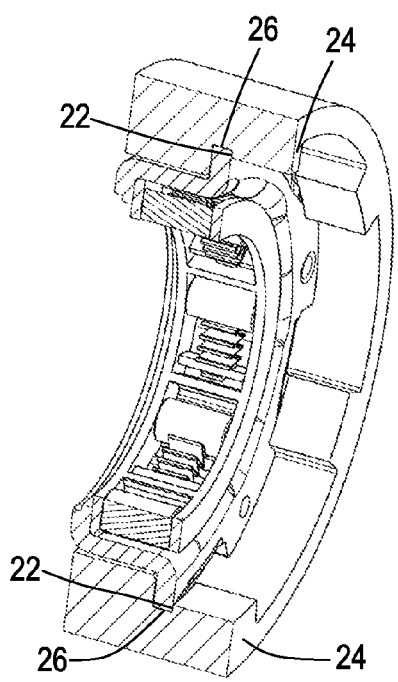

In the section view according to FIG. 11, which is guided in a somewhat different section plane by the mounted arrangement, namely in the area of two grooves 26 in the area of the contact sections 24 it can be seen how the clamping sections 21 or the surface sections 22 engage in the groove 26 or undercut the groove flank and are supported there, which leads, as described, to the "burying" of the hook 16 due to the different heights h1 and h2 in the housing shoulder 25.

As described, the sleeve 2 is preferably a sheet metal part, advantageously made from steel sheet metal, which is deformed accordingly in a deep-drawing process for forming the final contour. Here, all relevant geometries can be formed, in particular, the hooks 16 and the corresponding ramp-like clamping sections 21, etc. The housing 8 on its side is made from a lightweight metal, for example, aluminum or a lightweight metal alloy, optionally based on aluminum. However, other materials are also conceivable.

LIST OF REFERENCE NUMBERS

1 Sleeve-type freewheel
2 Sleeve
3 Clamping ramps
4 Rollers
6 Springs
7 Cage
8 Housing
9 Radial flange
10 Sleeve section
11 Radial flange
12 Radial projection
13 Recess
14 Stop face
15 Bottom side
16 Hook
17 Embossment
18 Hook
19 Opening
20 Top side
21 Clamping sections
22 Clamping section
23 Inner circumference
24 Contact section
25 Housing shoulder
26 Groove
27 Stop face
28 Mounting tool
29 Engagement pin

The invention claimed is:

1. A sleeve-shaped freewheel comprising a sleeve with clamping ramps provided on an inner circumference, a plurality of needle-shaped or roller-shaped clamping bodies allocated to the clamping ramps, a housing made from metal holds the sleeve, the sleeve has a radial flange on which at least one radial projection is provided on which an axially projecting hook is formed, a plurality of radially inward projecting contact sections distributed around an inner circumference of the housing, the at least one radial projection is held between two of the projecting contact sections in a mounting position, a groove is formed in the housing between the contact sections and a housing shoulder supporting a side of the radial flange having the axially projecting hook, and in the mounting position in which the at least one radial projection contacts one of the contact sections, the radial flange is held in the groove in a clamped manner with the axially projecting hook hooking into the housing shoulder.

2. The sleeve-shaped freewheel according to claim 1, wherein the at least one radial projection includes a plurality of radial projections that each contact a respective one of the contact sections in the mounting position.

3. The sleeve-shaped freewheel according to claim 2, wherein the axially projecting hook includes a plurality of hooks each formed on respective ones of the radial projections, and the plurality of hooks each hook onto the housing shoulder in the mounting position.

4. The sleeve-shaped freewheel according to claim 2, wherein the axially projecting hook has a hook tip or hook edge that is directed opposite a direction of a respective stop face of an adjacent one of the at least one radial projections.

5. The sleeve-shaped freewheel according to claim 1, wherein the sleeve is a sheet metal part, and at least one of (1) the axially projecting hook, (2) the clamping sections, or (3) receptacles or openings are formed through embossing or punching.

6. The sleeve-shaped freewheel according to claim 1, wherein the axially projecting hook partially deforms the housing shoulder to hold the radial flange in the groove in the clamped manner.

7. The sleeve-shaped freewheel according to claim 1, wherein the housing is formed from a softer material than a material forming the sleeve.

8. A sleeve-shaped freewheel comprising a sleeve with clamping ramps provided on an inner circumference, a plurality of needle-shaped or roller-shaped clamping bodies allocated to the clamping ramps, a housing made from metal holds the sleeve, the sleeve has a radial flange on which at least one radial projection is provided on which an axially projecting hook is formed, a plurality of radially inward projecting contact sections distributed around an inner circumference of the housing, the at least one radial projection is held between two of the projecting contact sections in a mounting position, a groove is formed in the housing between the contact sections and a housing shoulder supporting a side of the radial flange having the axially projecting hook, and in the mounting position in which the at least one radial projection contacts one of the contact sections, the radial flange is held in the groove in a clamped manner with the axially projecting hook hooking on the housing shoulder, wherein ramp-shaped clamping sections that engage respective ones of the contact sections when inserted into respective groove sections of the groove are provided on the radial flange adjacent to the radial projection.

9. A sleeve-shaped freewheel comprising a sleeve with clamping ramps provided on an inner circumference, a plurality of needle-shaped or roller-shaped clamping bodies allocated to the clamping ramps, a housing made from metal holds the sleeve, the sleeve has a radial flange on which at least one radial projection is provided on which an axially projecting hook is formed, a plurality of radially inward projecting contact sections distributed around an inner circumference of the housing, the at least one radial projection is held between two of the projecting contact sections in a mounting position, a groove is formed in the housing between the contact sections and a housing shoulder supporting a side of the radial flange having the axially projecting hook, and in the mounting position in which the at least one radial projection contacts one of the contact sections, the radial flange is held in the groove in a clamped manner with the axially projecting hook hooking on the housing shoulder, wherein a receptacle or an opening for setting a mounting tool, with which the sleeve is turned into the mounting position after insertion into the housing, are provided on (1) the radial flange, or on (2) the at least one radial projection.

10. The sleeve-shaped freewheel according to claim 9, wherein the at least one radial projection includes a plurality of radial projections, wherein an even number of the plurality of radial projections is provided, and (1) a first plurality of the plurality of radial projections each include the axially projecting hook, and (2) a second, alternating plurality of the plurality of radial projections each include the receptacle or the opening.

* * * * *